(12) United States Patent
Beaver, III et al.

(10) Patent No.: US 9,183,582 B2
(45) Date of Patent: Nov. 10, 2015

(54) TILING PROCESS FOR DIGITAL IMAGE RETRIEVAL

(75) Inventors: Robert Irven Beaver, III, San Francisco, CA (US); Leslie Young Harvill, Half Moon Bay, CA (US); Richard Harold Bean, Cupertino, CA (US)

(73) Assignee: Zazzle Inc., Redwood City, CA (US)

(*) Notice: Subject to any disclaimer, the term of this patent is extended or adjusted under 35 U.S.C. 154(b) by 128 days.

(21) Appl. No.: 13/601,941

(22) Filed: Aug. 31, 2012

(65) Prior Publication Data

US 2013/0057549 A1 Mar. 7, 2013

Related U.S. Application Data

(60) Provisional application No. 61/529,883, filed on Aug. 31, 2011.

(51) Int. Cl.
*G06T 19/00* (2011.01)
*G06Q 30/06* (2012.01)
*H04N 1/00* (2006.01)
*H04N 1/387* (2006.01)

(52) U.S. Cl.
CPC ........ *G06Q 30/0621* (2013.01); *G06Q 30/0643* (2013.01); *G06T 19/00* (2013.01); *H04N 1/0019* (2013.01); *H04N 1/00161* (2013.01); *H04N 1/3871* (2013.01); *H04N 1/3875* (2013.01); *G06T 2200/16* (2013.01); *G06T 2210/36* (2013.01); *Y10S 707/948* (2013.01); *Y10S 707/962* (2013.01)

(58) Field of Classification Search
None
See application file for complete search history.

(56) References Cited

U.S. PATENT DOCUMENTS

| | | |
|---|---|---|
| 6,591,011 B1 | 7/2003 | Nielsen |
| 6,664,972 B2 | 12/2003 | Eichel et al. |
| 6,725,257 B1 | 4/2004 | Cansler et al. |
| 7,016,869 B1 | 3/2006 | Haeberli |

(Continued)

FOREIGN PATENT DOCUMENTS

| | | |
|---|---|---|
| EP | 1 124 200 A2 | 1/2001 |
| EP | 1124200 A2 * | 8/2001 |

(Continued)

OTHER PUBLICATIONS

Internatioanl Searching Authority, "Search Report", in application No. PCT/2012/053536, dated Nov. 9, 2012, 10 pages.

(Continued)

*Primary Examiner* — Phi Hoang
*Assistant Examiner* — Diane Wills
(74) *Attorney, Agent, or Firm* — Hickman Palermo Becker Bingham LLP (57) ABSTRACT

Techniques for digital image retrieval are described. In an embodiment a system stores a plurality of tiles for a plurality of versions of a particular image. Each respective image of the plurality of versions has a different resolution. Each respective tile of the plurality of tiles comprises a bounded region of the respective version of the particular image. Based on a display resolution where a portion of the particular image will be visible, the system determines a final image resolution for the particular image. The system fetches one or more tiles of the respective version of the particular image that has the final resolution. The one or more tiles include the portion of the particular image that will be displayed. The system applies the one or more tiles to a model and renders the model.

20 Claims, 5 Drawing Sheets

(56) References Cited

U.S. PATENT DOCUMENTS

| | | | |
|---|---|---|---|
| 7,062,483 B2 | 6/2006 | Ferrari et al. | |
| 7,502,788 B2 | 3/2009 | Balasubramanian | |
| 7,617,184 B2 | 11/2009 | Ferrari et al. | |
| 7,730,053 B2 | 6/2010 | Sauermann | |
| 7,734,731 B2 | 6/2010 | Ordille et al. | |
| 7,761,397 B2 | 7/2010 | Huelsman et al. | |
| 7,831,589 B2 | 11/2010 | Balasubramanian | |
| 7,856,434 B2 | 12/2010 | Gluzman Peregrine et al. | |
| 7,865,523 B2 | 1/2011 | Caballero et al. | |
| 7,885,956 B2 | 2/2011 | Danish et al. | |
| 8,190,486 B1 | 5/2012 | Ouimet | |
| 8,290,822 B2 | 10/2012 | Gade et al. | |
| 8,335,724 B2 | 12/2012 | Sipes et al. | |
| 8,429,110 B2 | 4/2013 | Cai et al. | |
| 8,458,050 B2 | 6/2013 | Bagley et al. | |
| 8,495,163 B2 | 7/2013 | Ordille et al. | |
| 8,566,714 B1 | 10/2013 | Stringer et al. | |
| 2001/0034668 A1 | 10/2001 | Whitworth | |
| 2002/0030689 A1 | 3/2002 | Eichel et al. | |
| 2002/0073001 A1 | 6/2002 | Palmer et al. | |
| 2002/0083039 A1 | 6/2002 | Ferrari et al. | |
| 2003/0080978 A1 | 5/2003 | Navab et al. | |
| 2004/0133081 A1 | 7/2004 | Teller et al. | |
| 2005/0138078 A1 | 6/2005 | Christenson et al. | |
| 2005/0164766 A1 | 7/2005 | Haim et al. | |
| 2005/0234993 A1 | 10/2005 | Ordille et al. | |
| 2005/0258234 A1 | 11/2005 | Silverbrook et al. | |
| 2005/0271283 A1* | 12/2005 | Dekel et al. | 382/232 |
| 2005/0276444 A1 | 12/2005 | Zhou et al. | |
| 2006/0004697 A1 | 1/2006 | Lipsky et al. | |
| 2006/0038815 A1 | 2/2006 | Loberg | |
| 2006/0155612 A1 | 7/2006 | Haeberli | |
| 2006/0197775 A1 | 9/2006 | Neal | |
| 2007/0033568 A1 | 2/2007 | Barrieau et al. | |
| 2007/0067179 A1 | 3/2007 | Kerr et al. | |
| 2007/0094204 A1 | 4/2007 | Huelsman et al. | |
| 2007/0098234 A1 | 5/2007 | Fiala | |
| 2007/0124215 A1 | 5/2007 | Simmons | |
| 2007/0143082 A1 | 6/2007 | Degnan | |
| 2007/0168336 A1 | 7/2007 | Ransil et al. | |
| 2007/0174781 A1 | 7/2007 | Begin et al. | |
| 2007/0203798 A1 | 8/2007 | Caballero et al. | |
| 2007/0226155 A1 | 9/2007 | Yu et al. | |
| 2008/0069451 A1 | 3/2008 | Ikeda | |
| 2008/0091551 A1 | 4/2008 | Olheiser et al. | |
| 2008/0162305 A1 | 7/2008 | Russo et al. | |
| 2008/0247674 A1 | 10/2008 | Walch | |
| 2008/0285854 A1 | 11/2008 | Kotake et al. | |
| 2009/0028414 A1* | 1/2009 | Crandall et al. | 382/133 |
| 2009/0043673 A1 | 2/2009 | Caballero et al. | |
| 2009/0043759 A1 | 2/2009 | Danish et al. | |
| 2009/0177551 A1 | 7/2009 | Cue et al. | |
| 2009/0195538 A1 | 8/2009 | Ryu et al. | |
| 2009/0271295 A1 | 10/2009 | Hodge | |
| 2009/0289955 A1 | 11/2009 | Douris et al. | |
| 2009/0317010 A1 | 12/2009 | Gerhard et al. | |
| 2009/0324100 A1 | 12/2009 | Kletter et al. | |
| 2010/0048290 A1 | 2/2010 | Baseley et al. | |
| 2010/0066731 A1 | 3/2010 | Vecore et al. | |
| 2010/0066750 A1 | 3/2010 | Yu et al. | |
| 2010/0092079 A1 | 4/2010 | Aller | |
| 2010/0124384 A1* | 5/2010 | Edgar et al. | 382/313 |
| 2010/0145492 A1 | 6/2010 | Russell | |
| 2010/0185529 A1 | 7/2010 | Chestnut et al. | |
| 2010/0189316 A1 | 7/2010 | Walch | |
| 2010/0238166 A1 | 9/2010 | Tamstorf et al. | |
| 2010/0287511 A1 | 11/2010 | Meier et al. | |
| 2010/0318476 A1 | 12/2010 | Huelsman et al. | |
| 2011/0098837 A1 | 4/2011 | Yucel et al. | |
| 2011/0102440 A1* | 5/2011 | Yuen et al. | 345/428 |
| 2011/0208618 A1 | 8/2011 | Christenson et al. | |
| 2011/0225038 A1 | 9/2011 | Fontoura et al. | |
| 2011/0280447 A1 | 11/2011 | Conwell | |
| 2011/0305368 A1 | 12/2011 | Osako | |
| 2012/0039547 A1* | 2/2012 | Gerhard et al. | 382/305 |
| 2012/0047045 A1 | 2/2012 | Gopikrishna et al. | |
| 2012/0117072 A1 | 5/2012 | Gokturk et al. | |
| 2012/0123674 A1 | 5/2012 | Perks et al. | |
| 2012/0158535 A1 | 6/2012 | Barrieau et al. | |
| 2012/0218300 A1 | 8/2012 | Hayakawa | |
| 2013/0060801 A1 | 3/2013 | Beaver et al. | |
| 2014/0160118 A1 | 6/2014 | Beaver, III et al. | |
| 2015/0025994 A1 | 1/2015 | Beaver, III et al. | |

FOREIGN PATENT DOCUMENTS

| | | |
|---|---|---|
| EP | 1 365 358 A2 | 11/2003 |
| JP | 2001-521659 A | 11/2001 |
| JP | 2003-264740 | 6/2003 |
| JP | 2007-257176 | 10/2007 |
| JP | 2010-117870 | 5/2010 |
| JP | 2010-231529 | 10/2010 |
| JP | 2010-287174 A | 12/2010 |
| WO | WO 98/47106 | 10/1998 |
| WO | WO2009/094724 A1 | 8/2009 |
| WO | WO 2009/094724 A1 | 8/2009 |

OTHER PUBLICATIONS

Current Claims PCT/2012/053536, dated Nov. 2012, 5 pages.
Schalkoff R. J., "Syntactic Pattern Recognition (Syntrp) Overview", Pattern Recognition: Statistical, Structural ad Neural Approaches, Wiley, 68 pages, dated 1992.
European Patent Office, "Office Action", in application No. 12181208.5-1238, dated Dec. 6, 2012, 7 pages.
Current Claims in application No. 12181208.5-1238, dated Dec. 2012, 4 pages.
"Product Configurator", IBM, available: <http://www.-01.ibm.com/software/commerce/products/products/product-configurator/>, retrieved Nov. 26, 20103.
"Product Configuration System", Oracle, available: <http://www.bigmachines.com/product_configuration_system.php>, retrieved Nov. 26, 2013.
"Knowledge-based configuration", Wikipedia, available: <http://en.wikipedia.org/wiki/Knowledge-based_configuration>, retrieved Nov. 26, 2013.
"IBM Sterling Configurator—Customize complex products, services and bundles", IBM Software, available: <http://www.-01.ibm.com/software/commerce/products/products/product-configurator/>, Nov. 26, 2013.
Zhang et al., "Visual Marker Detection and Decoding in AR Systems: A Comparative Study", IEEE, dated 2002, 10 pages.
International Searching Authority, "Search Report" in application No. PCT/US12/53535, dated Feb. 5, 2013, 12 pages.
Current Claims in application No. PCT/US12/53535, dated Feb. 2013, 5 pages.
Soltani et al., "Using Augmented-Reality on Planar Surfaces for Previewing Décor Changes", Stanford University EE368 Class Project Spring 2010, 5 pages.
Schalkoff R.J., "Syntactic Pattern Recognition (Syntrp) Overview", dated Jan. 1, 1992, Pattern Recognition: Structural, Structural and Neural Approaches, 68 pages.
Rosin, Paul, "Training Cellular Automata for Image Processing", SCIA dated 2005, LNCS, 10 pages.
Rekimoto, Jun, "Matrix: A Realtime Object Identification and Registration Method for Augmented Reality", Computer Human Interaction, dated Jul. 15-17, 1998, 6 pages.
Lee et al., "Real-time Color Correction for Marker-based Augmented Reality Applications", International Workshop on Ubiquitos VR, dated 2009, 4 pages.
Choudary et al, "March: Mobile Augmented Reality for Cultural Heritage", MM 2009, dated Oct. 19-24, 2009, Beijing China, 2 pages.
Capterra Website, "Top Product Configurator Software Products", dated 2014, Reviews of the Best Systems, accessed online <http://www.capterra.com/product-configurator-software> on May 28, 2014, 15pgs.
Japan Patent Office, "Notice of Grounds for Rejection" in application No. 2012-191111, dated Mar. 11, 2014, 4 pages.

(56) References Cited

OTHER PUBLICATIONS

Current Claims in Japan application No. 2012-191111, dated Mar. 2014, 4 pages.
X. Zhang et al., Visual Marker Detection and Decoding in AR Systems: A Comparative Study, IEEE, ACM, dated Sep. 2002, pp. 97-106.
Cardone A. et al., A Survey of Shape Similarity Assessment Algororithms for Product Design and Manufacturing Applications, J Comput Inf. Science Eng 3:109-118, dated 2003.
Schalfoff R, J:, "Syntactic Pattern Recognition SYNTPR Overview" Pattern Recognition Statistical, Structural and Neural Approaches, dated Jan. 1, 1992, 68 pages.
European Patent Office, "Search Report" in application No. 12 181 208.5-1955, dated Feb. 26, 2015, 5 pages.
European Claims in application No. 12 181 208.5-1955, dated Feb. 2015, 4 pages.
Hirokazu Kato and Mark Billnghurst. "ARToolkit User Manual", Human Interface Technology Lab, University of Washington, dated 2000, 44 pages.
Hirokazu Kato and Mark Billinghurst. "Marker Tracking and HMD Calibration for a Videobased Augmented Reality Conferencing System", In Proceedings of the $2^{nd}$ International, Workshop on Augmented Reality (IWAR 1999), San Francisco, USA Dated Oct. 1999, 10 pages.
Mark Fiala, "Artag, A Fiducial Marker System Using Digital Techniques", In CVRP '05: Proceedings of the 2005 IEEE Computer Society Conference on Computer vision and Pattern Recognition (CVPR) 2:590-596. IEEE Computer Society, dated 2005, 7 pages.
Ryan A. Beasley, "Semiautonomous Medical Image Segmentation Using Seeded Cellular Automation Plus Edge Detector", International Scholarly Research Network ISRN Signal Processing Volume, dated 2012, Article ID 914232, 9 pages.
Daniel Wagner, Tobias Langlotz, and Dieter Schmalstieg, "Robust and Unobtrusive Marker Tracking on Mobile Phones", In ISMAR '08: Proceedings of the $7^{th}$ IEEE/ACM International Symposium on Mixed and Augmented Reality, Washington, DC, USA, Dated 2008, IEEE Computer Society, 4 pages.
Johannes Kohler, Alain Pagani, and Didier Stricker, "Detection and Identification Techniques for Markers Used in Computer Vision", Digital Object Identifier 10.4230/OASics. VLUDS.2010.36, dated 2010, 9 pages.
Homayoun Bagherinia O Roberto Manduchi, "Robust Real-Time Detection of Multi-Color Markers on a Cell Phone", J Real-Time Image Proc., Dated Jun. 3, 2011, 17 pages.
Jun Rekimoto, "Matrix: A Realtime Object Identication and Registration Method for Augmented Reality", Computer Human Interaction, Dated 1998, Proceedings, $3^{rd}$ Asia Pacific, Jul. 15-17, 1998, 6 pages.
Jun Rekimoto and Yuji Ayatsuka, "CyberCode: Designing Augmented Reality Environments with Visual Tags", Proceedings of DARE 2000 on Designing, Dated Apr. 2000, 10 pages.
Martin Hirzer, "Marker Detection for Augmented Reality Applications", Graz University of Technology, Austria, Dated Oct. 27, 2008, 27 pages.
W. Lee and W. Woo, "Real-time Color Correction for Marker-Based Augmented Reality Applications", International Workshop on Ubiquitous VR (IWUVR2009), dated 2009, 4 pages.
Nima Soltani, Mehmet Yilmax, "Using Augmented-Reality on Planar Surfaced for Previewing Décor Changes", Stanford University EE368 Class Project Spring, dated 2010, 5 pages.
Pantida Patirupanusara, "Marker-Based Augmented Reality Magic Book for Anatomical Education", International Conference on Computer and Communication Technologies (ICCCT'2012) May 26-27, 2012, Phuket, 3 pages.
Paul L. Rosin, "Training Cellular Automata for Image Processing", SCIA 2005, LNCS 3540, dated 2005, 10 pages.
Omar Choudary, Vincent Charvillat, Romulus Grigoras, and Pierre Gurdjos,"MARCH: Mobile Augmented Reality for Cultural Heritage", MM'09, Dated Oct. 19-24, 2009, Beijing, China, 2 pages.
Pakemon AR Marker in Sep. 2001 (http://pokemasters.net/forums/showthread.php?t=24845) 17 pages.

* cited by examiner

TILING PROCESS FOR DIGITAL IMAGE RETRIEVAL

CROSS-REFERENCE TO RELATED APPLICATION

This application claims the benefit under 35 U.S.C. 119(e) of Provisional Patent Application No. 61/529,883, filed Aug. 31, 2011, the entire contents of which are hereby incorporated by reference for all purposes as if fully set forth herein.

This application is related to U.S. application Ser. No. 11/925,716, filed Oct. 26, 2007, U.S. application Ser. No. 13/539,788, filed Jul. 2, 2012, and U.S. application Ser. No. 13/601,931, filed Aug. 31, 2012, the contents of all of which are incorporated herein, by reference, in their entirety for all purposes as if fully set forth herein.

BACKGROUND

Certain approaches described in certain sections of this disclosure and identified as "background" or "prior approaches" are approaches that could be pursued, but not necessarily approaches that have been previously conceived or pursued. Therefore, unless otherwise indicated, it should not be assumed that any of the approaches that are so described actually qualify as prior art merely by virtue of identification as "background" or "prior approaches."

In a computer-based system that supports identifying, ordering and displaying preview images of custom framed products, it may be useful to display a simulated close-up scene showing a corner of a product to be manufactured, showing a mitered corner of a frame, detail of one or more mats, and detail of an image to be framed in the frame with the one or more mats. Indeed, in approaches that permit users to order pre-manufactured framed prints or other visual works, it is conventional to provide the user with a display of one or more corners of the product so the user can see details of the frame, mat, and image.

However, a particular system may permit a user to upload one or more digital images, and rearrange the images in terms of position, and prepare composite images in which multiple source images are combined using, for example, overlapping approaches. Users may comprise end user consumers or creators of digital assets such as stock photography houses, artists, representatives of artists, and others. The digital images may have any size and any content. In such a system, displaying a scene having a correct representation of the corner of the image becomes challenging. Displaying such a scene of the corner requires accessing the image asset in real time, obtaining a set of data equivalent to the particular corner at the correct size or scale, and rendering the data to show the image corner while applying overlapping, cropping, translation or other effects.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
 1.0 General Overview
 2.0 Structural and Functional Overview
 3.0 Pre-Computation of Tiles
 4.0 Rendering Process
 5.0 Implementation Mechanisms-Hardware Overview
 6.0 Extensions and Alternatives
 1.0 General Overview Techniques are described for optimizing digital image retrieval and rendering. In an embodiment, a plurality of tiles are stored for a plurality of versions of a particular image. Each respective image of the plurality of versions has a different resolution. Each respective tile of the plurality of tiles comprises a bounded region of the respective version of the particular image. Based on a display resolution where a portion of the particular image will be visible, a final image resolution is determined for the particular image. One or more tiles are fetched for the respective version of the particular image that has the final resolution. The one or more tiles include the portion of the particular image that will be displayed. The one or more tiles are applied to a model, which is then rendered.

In an embodiment a first version of the particular image having a first resolution is received. A plurality of derivative versions of the particular image are generated from the first version. Each derivative image has a lower resolution than the first resolution. The plurality of versions of the image include the derivative versions of the particular image.

The shape of the bounded region may vary from implementation to implementation. In an embodiment, the bounded region is a rectangle. In addition or alternatively, the tiles may be implemented using other shapes or complex regions.

In an embodiment, a visible rectangle is identified in a coordinate space of the particular image. The visible rectangle is a rectangle that completely contains the portion of the image that will be visible. Once identified, the visible rectangle is inflated to include all tiles that overlap the visible rectangle and that are for the respective version of the particular image that has the final image resolution. The fetched one or more tiles are the tiles that overlap the visible rectangle.

In an embodiment, determining a final image resolution comprises: determining a quantity of pixels associated with displaying the portion of the particular image; applying a scaling factor to the quantity of pixels to identify a minimum resolution; and rounding the minimum resolution to a next higher resolution available from the plurality of versions of the particular image. The final resolution is the next higher resolution available from the plurality of versions of the particular image. The scaling factor used may vary from implementation to implementation. In an embodiment, the scaling factor approximates the Nyquist limit.

In an embodiment, the model is a three-dimensional (3D) model having a particular geometry. The geometry of the 3D model may vary from implementation to implementation. In an embodiment, the 3D model is of a custom product. In another embodiment, applying the one or more tiles to the model comprises computing a 3D transformation for the particular geometry to generate a transformed geometry based on the one or more tiles and mapping the one or more tiles to the transformed geometry.

In an embodiment, the transformed geometry excludes portions of the particular geometry that map to tiles that are not fetched for the respective version of the particular image that has the final image resolution. Rendering the model comprises rendering the model according to the transformed geometry.

2.0 Structural and Functional Overview

In an embodiment, a user uploads an original image, which is typically a high-resolution image having a size on the order of 3000 pixels by 3000 pixels. In response to initial uploading, the system may create and store a master derivative image, having a smaller size, such as 1000 by 1000 pixels, for use in ancillary functions such as previewing, generating thumbnails, or others. However, when a corner of the frame, mat and image are to be shown, using the master derivative image typically results in a corner representation that is blurry because of losses occurring when the corner is selected and zoomed. Further, applying rigid image processing approaches is problematic because source images are obtained from users and may have size, resolution and other attributes that are not uniform or predictable. The system essentially is expected to provide the ability to seek to an arbitrary region of an image and correctly render a corner segment as part of a display of a virtual frame and mat.

In an embodiment, the computer system receives high-resolution original images and stores the original images in a large image data store. In an embodiment, the image data store is capable of storing millions of images. In an embodiment, images from the data store are used as textures in three-dimensional (3D) models for rendering, on a user computer display, renderings of the models. A particular rendering of a model may use one or more arbitrarily selected images from the data store.

In an embodiment, the system renders the models using an optimal image resolution for each image. In this context, optimal has two principal meanings. First, the system seeks to use the best possible image fidelity in the on-screen rendering of the model. Second, the system seeks to use the least time possible to render the model with a particular processor, server computer, or client computer.

In addressing these tradeoffs, if rendering time could be ignored, then the system could always use the highest resolution of the original image, as the original image's high resolution necessarily provides the best image fidelity. However, using the highest resolution also requires the most time to render each image texture as compared to using a lower resolution version of the original image. In an embodiment, a goal for maximum rendering time is 100 ms. In the approaches herein, it is possible to produce an on-screen display that is essentially indistinguishable from a display that uses the original images, while using minimum time to generate the display, by intelligent selection of an appropriate image resolution for each image to be displayed.

The goal for minimum rendering time includes time to retrieve each image from the data store, time to decompress the image into memory, and time to produce the onscreen rendering of the model containing the images. In general, the higher the image resolution, the more time will be consumed in each of the preceding individual rendering steps. Retrieving a high-resolution image from the data store requires transferring a large amount of data. Further, compared to a lower-resolution image, a high-resolution image consumes more computer memory and requires more processor time to decompress and render into the scene.

In many typical scenes, some images are not entirely visible. Transferring and decompressing the entire image, if only a small part of it is visible, wastes time and processing resources. In an embodiment, a way to retrieve and decompress only the visible part of the image is provided. Therefore, in an embodiment, a higher-resolution version of the visible part can be used, without incurring the cost in time and storage space of using the higher-resolution version of the entire image. Accordingly, in an embodiment, a process can display high-fidelity model renderings in a given time using only parts of higher-resolution images as compared to using entire lower resolution images.

Figure 1:
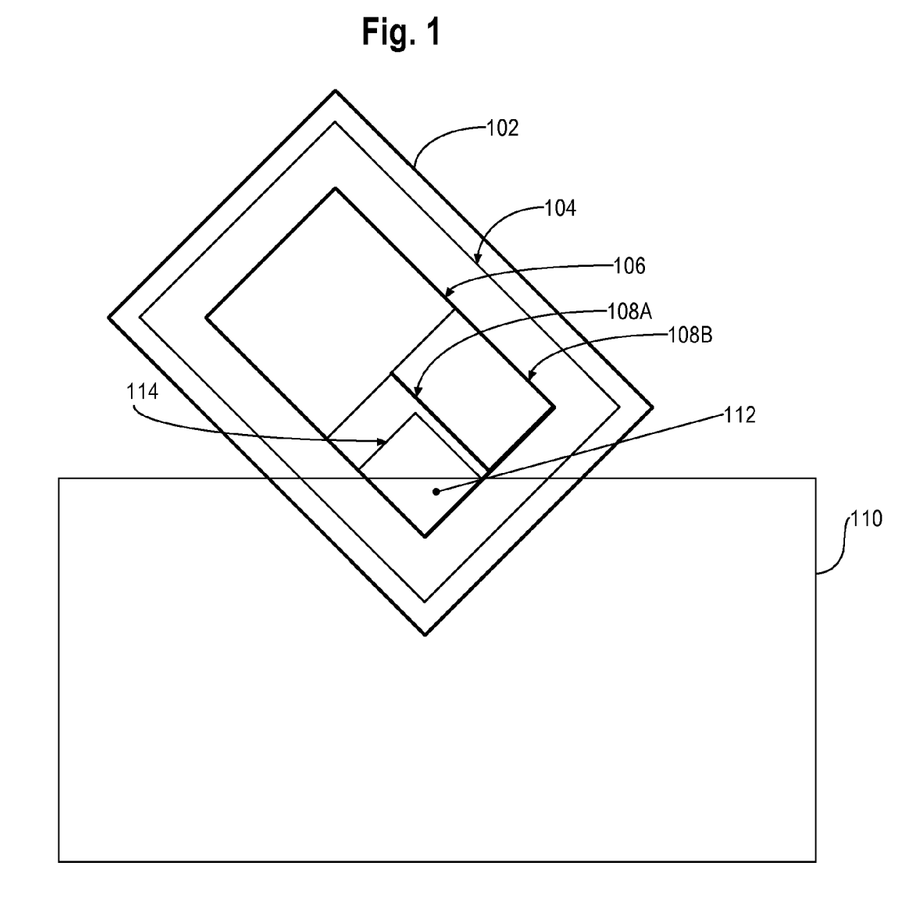
FIG. 1 illustrates a representation of a framed custom manufactured product in relation to a portion of a user computer image display using the techniques herein.

FIG. 1 illustrates a representation of a framed custom manufactured product in relation to a portion of a user computer image display using the techniques herein. In an embodiment, the framed custom manufactured product may comprise a frame 102, a mat 104, and an image 106. Displaying a close-up of a corner of the framed custom manufactured product may comprise rotating and scaling a composite image of the frame 102, mat 104, and image 106 so that a truncated corner is displayed within a user screen display as represented by image region 110. Displaying the close-up involves, in part, retrieving one or more image tiles 108 of a portion of the image 106 that is within the image region 110.

From FIG. 1 it may be seen that if image 106 is a large digital file, it would be a waste of time and processing resources to retrieve the entire image from storage when only portions of the image, within tiles 108A, 108B, are visible in the corner portion that falls within the user display image region 110. Tiles 108A, 108B comprise rectangular sub regions of the image 106 but may be formed in polygons or shapes other than rectangles in other embodiments. In an embodiment, a combination of frame 102, mat 104, and image 106 comprises a 3D model. For purposes of illustrating a clear example, FIG. 1 shows two tiles 108A, 108B but in practice each image 106 typically is partitioned into four (4) or more tiles and any number of tiles may be stored.

It will be seen that correct display in the image region 110 involves rotation and transformation of image 106 within the 3D model. A reverse transformation of point coordinates from a coordinate space of the image region 110 to a second coordinate space of the image 106 is used in order to determine what coordinates of pixels in a triangular region 112 are required to fit into the user image region. As an example, assume that opposite corners of a coordinate system of the image 106 have real number coordinates of (0,0) at the origin and (1,1) at a diagonally opposite corner. Triangular region 112 might have corner coordinates of (1,0) (0.7, 0) (1, 0.7). A first rectangular tile 108A completely encloses triangular region 112 would be retrieved.

In an embodiment, a data processing process to address the foregoing issues generally comprises an offline process of pre-computing certain image data, and a rendering process that may be viewed as a live or online process.

Figure 2:
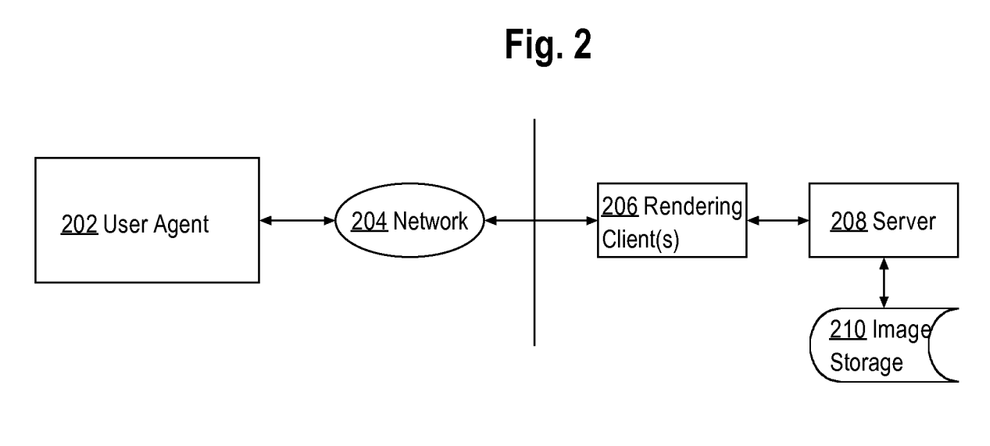
FIG. 2 illustrates a computer system that may be used to implement the processes described herein.

FIG. 2 illustrates a computer system that may be used to implement the processes described herein. A user agent 202 is coupled directly or indirectly through one or more networks 204 to one or more rendering clients 206, which are coupled to a server computer 208 that can access an image store 210. User agent 202 may comprise a browser hosted on a personal computer, tablet computer, workstation, smartphone, mobile device or other computing device. Network 204 may comprise a LAN, WAN, public internetworks, or a combination of one or more of any of the foregoing. Typically rendering clients 206, server computer 208, and image store 210 are co-located within a local network for high speed communication.

In an embodiment, user agent 202 is configured or programmed to request image renderings, and server computer 208 is configured to retrieve images 106 or tiles 108A, 108B from image store 210 and transfer the images or tiles to rendering clients 206, which implement other aspects of the processes herein. The rendering clients 206 then transfer completed renderings to the user agent 202 for display to the user. However, the division of processing responsibility between rendering clients 206 and server computer 208, as described specifically herein, is not mandatory and one or all of the functions described herein for the rendering clients may be implemented at the server computer.

In some embodiments, image 106 as shown in FIG. 1 may comprise multiple separate images that are related or associated as a composite image that is described by metadata referencing the component images of the composite image. For example, multiple separate images may be layered or otherwise composited to produce the composite image. In these embodiments, retrieving image 106, tiles 108A, 108B, or other portions of the image that correspond to the inflated visible rectangle or triangular region 112 may involve initially determining what portion of the composite image is required and determining which tiles are associated with that portion. A consequence of allowing the user to create and use a composite image is that it is not possible to pre-compute and store a corner portion for each user image for use in rendering a 3D model of a frame, mat and user image.

In an embodiment, the size, aspect ratio, and/or resolution of the one or more tiles are chosen based on the characteristics of a particular image as it is rendered for a particular set of one or more models. By selecting tile attributes in this manner, transfer and rendering of tiles may be optimized for the model set to which the particular image is applied.

3.0 Pre-Computation of Tiles

Figure 3:
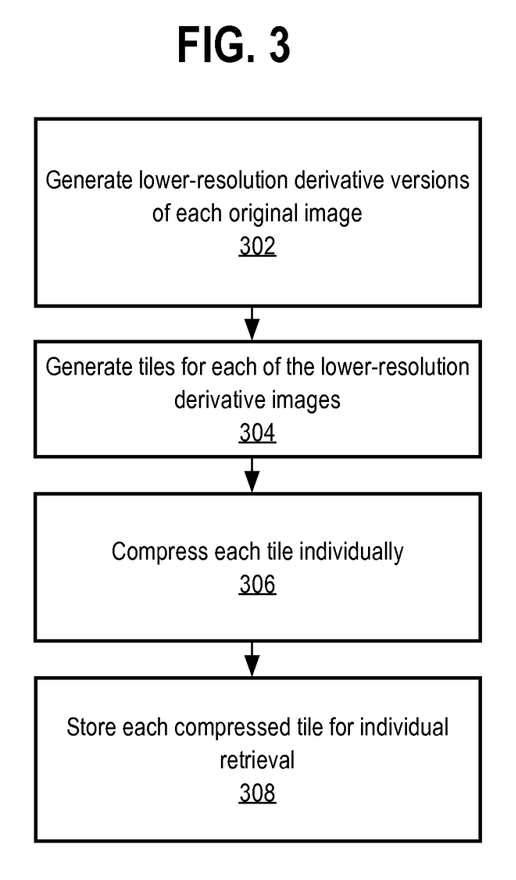
FIG. 3 illustrates a pre-computation process according to an embodiment.

FIG. 3 is a flowchart illustrating a process for pre-computing tiles, according to an embodiment. The pre-computation process may be implemented as an offline process. In step 302, the process generates a plurality of lower-resolution versions of each original image at several different resolutions using a high quality image scaling process to maximize the image quality at each resolution. In an embodiment, derivative images are created and stored using sizes of 1024× 1024 pixels, 2048×2048 pixels, 3072×3072 pixels, 4096× 4096 pixels, 6144×6144 pixels, 8192×8192 pixels, about 12288×12288 pixels, and 16384×16384 pixels, up to the largest size that is less than or equal to the size of the original image uploaded by the content creator. Additionally or alternatively, the content creator or owner of the original image may create and upload the derivative images.

The highest resolution original image is retained for use in actual manufacture or production of the custom framed manufactured product. In an embodiment, in response to a user or content creator uploading a high resolution original image, the process immediately or promptly creates a single derivative image of, for example, 1024 pixels per side, for the purpose of displaying a confirmation copy of the image to the user. Thereafter, the other derivative images may be prepared in an offline process.

In step 304, the process creates and stores, by copying from parts of each of the lower-resolution derivative images, a plurality of tiles, in which each tile comprises a contiguous, separate range of pixels of the associated derivative image. In an embodiment, each tile is a rectangle and comprise all pixels within the rectangle. In addition or alternatively, other tile shapes may be used. For example, the tile may be a triangle or an arbitrary bounded shape that comprises all pixels within its bounds.

In an embodiment, a plurality of image tiles are created and stored for each of the derivative images of the foregoing sizes. In an embodiment, each tile is configured with 512 pixels per side; in other embodiments, other tile sizes and aspect ratios may be used. For example, if a derivative image is 2048×2048 pixels, then sixteen (16) tiles of 512 pixels per side may be copied and stored based on the derivative image. In another example, the width of a tile may be 1024 pixels and the height of the tile may be 512 pixels to optimize application of the tiles to a particular model set.

In an embodiment, the size, aspect ratio, and resolution of the tiles that are created and stored in step 304 are chosen based on one or more characteristics of the particular image as it is rendered for a particular set of models. For example, the selection of a tile size and aspect ratio may involve seeking the smallest tile size that is compatible with particular goals for processing time or use of resources associated with image compression. The selection of a tile size and aspect ratio may also or alternately take into account the likelihood that multiple tiles would need to be transferred in order to capture the region of interest, or image contents, or usage scenarios. For instance, the tile attributes selected may depend on the original image's aspect ratio and the geometry of the set of models it is applied to for rendering. In an embodiment, the tile size is fixed and large image sizes involve creating more tiles. Alternatively, variable tile sizes may be used. Processing tests may be performed on the set of models using tiles having different attributes to determine which size, aspect ratio, and resolution most closely matches the particular goals for processing time and resource usage associated with rendering the particular image to the set of models.

In step 306, the process compresses each tile individually. The image compression algorithm may vary from implementation to implementation. Example compression algorithms include, without limitation, run-length encoding, chroma subsampling, predictive coding, deflation, color space reduction, entropy encoding, and transform coding.

In step 308, the process stores each compressed tile in the image data store in a manner that enables the tile to be retrieved individually. For example, the derivative image may be stored in association with metadata that describes the number of tiles and the location in the image data store of each of the tiles.

4.0 Rendering Process

Figure 4:
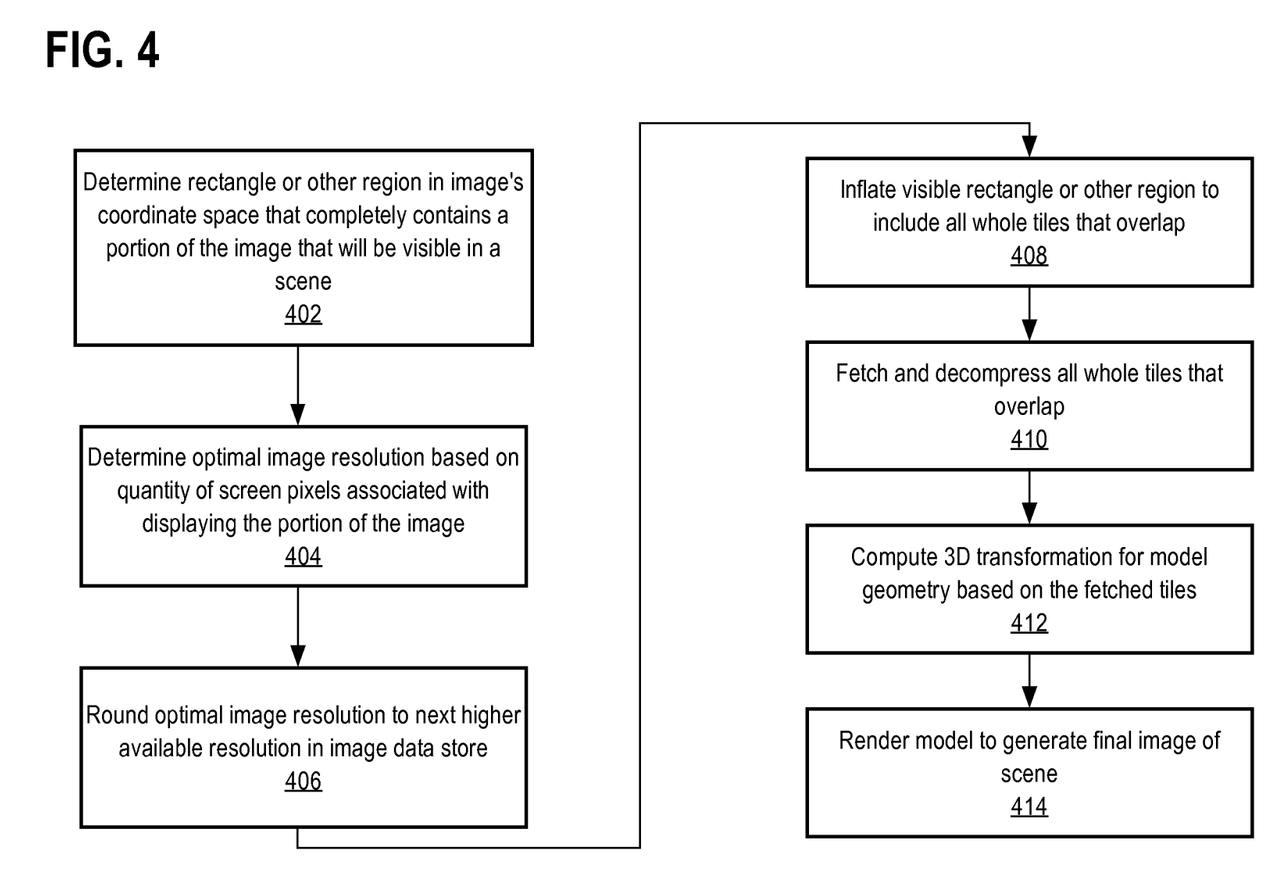
FIG. 4 illustrates a rendering process according to an embodiment.

FIG. 4 is a flowchart illustrating a rendering process, according to an embodiment. In an embodiment, the online rendering process comprises the following sub steps, performed for each appearance of an image in the scene.

In step 402, the process determines a rectangle in the image's coordinate space that completely contains the portion of the image that will be visible in that appearance; such a rectangle is termed a visible rectangle. For example, in FIG. 1, the visible image portion is triangular region 112 and visible rectangle 114 completely contains that portion. In other embodiments, other bounded regions may be determined in this step. For instance, more complex regions may be identified a this step as described in further detail below.

In step 404, the process determines an optimal image resolution to produce a high fidelity rendering of the image, given the number of screen pixels that will be covered by the visible portion of the image. In an embodiment, step 404 involves determining what quantity of pixels in the end consumer's display will be covered or used in displaying the final rendered scene, or a portion such as the triangular region 112 of FIG. 1. Use of the exact determined quantity for purposes of retrieving a derivative image has been found in practice to yield lesser quality results due to the presence of scaling artifacts after rendering. Therefore, in an embodiment the determined quantity is multiplied by a scaling factor, for example, 1.5. Alternatively, the Nyquist limit of 2.0 may be used as the scaling factor but empirical results indicate that such a value may be unnecessarily high because of the additional rounding up that is performed in step 406. The result is transformed into a size in pixels of a complete image. For example, if the triangular region 112 will occupy 400×400 pixels, then applying the scaling factor of 1.5 yields 600×600 pixels. Then, if the triangular region 112 represents about ⅓ of the complete original image, then a scaled complete original image would be about 1800×1800 pixels.

In step 406, the process rounds the optimal image resolution to the next higher available resolution in the image data store, which resolution is termed the final resolution. For example, if the scaled complete image size is 1800×1800, then the final resolution might be 2048×2048 pixels because that is the next larger size of an available derivative image. Tiles from that derivative image would be used in subsequent steps.

Steps 404 and 406 are based on the recognition that very large, high resolution images are not necessary to use because the final rendered dimensions and resolution of the region of interest will be lower. For example, referring again to FIG. 1, the length of the sides of triangular region 112, excluding the hypotenuse, might be 400×400 pixels. The dimensions in screen space of the triangular region 112 may be obtained by transforming the original image into screen space. At this resolution, the tiles from a derivative image having a resolution of 16384×16384 pixels will contribute little added image information or resolution as compared to using a derivative image having 4096×4096 pixels, after all scaling, other transformations and rendering are applied. Therefore, the present step and the next step implement a compromise between always using a high resolution original image and ensuring that the final rendered scene still has good fidelity even when a lower resolution tile is retrieved. The goal is to provide a final rendered scene that is indistinguishable from the original high resolution image while retrieving and processing a smaller, lower resolution derivative image. In the preceding example, using images with a resolution of larger than 2048×2048 pixels will yield indistinguishable improvement in appearance. Stated conversely, the process provides a way to select the smallest resolution derivative image that results in an on-screen appearance equivalent to the highest resolution derivative or original image.

In step 408, the process inflates the visible rectangle or other region to include all the whole tiles at the rounded resolution that overlap the visible rectangle; the result is termed the final rectangle. In the case of FIG. 1, the visible rectangle 114 would be inflated to the bounds of tile 108A. In other cases the visible rectangle 114 might be inflated to include multiple tiles 108A, 108B or others. For example, if the visible rectangle 114 is even slightly larger than a single tile, then four (4) tiles are retrieved as only whole tiles are capable of retrieval from the image store. Retrieving four (4) tiles in this manner has been found relatively common in practice and is a factor in determining the size of individual tiles for preparation in the offline process described above.

In step 410, the process fetches and decompresses the image tiles that are contained in the final rectangle at the final resolution into an in-memory image that represents exactly the final rectangle. In various embodiments, step 5 may also include retrieving and rendering only a specific desired region of interest, for example, only the visible rectangle 114 of FIG. 1 or only the triangular region 112 of FIG. 1.

In step 412, the process computes a new 3D transformation for the geometry containing the image, to compensate for the fact that the model's texture coordinates refer to the entire image rather than the final rectangle. Referring again to FIG. 1, image region 110 of the user display typically has one coordinate system expressed in pixel locations whereas the original image 106 has a different coordinate system that may or may not reference pixel sizes. For example, the coordinate system of image 106 may be (0,0) to (1,1). While the coordinate system for image 106 may be translated into the coordinate system of the image region 110, typical translation approaches assume that the entire image 106 is available whereas the present approach uses only a particular tile 108A. Therefore, in an embodiment, the geometry of a tile 108A is scaled and translated to match the portion of the entire image that is represented in the tile. This step prevents erroneous attempts at rendering portions of the image 106 that lie outside the scene represented in the image region 110. The result is that the tile 108A appears in a correct place in the scene of the image region 110.

In step 414, the model is rendered to generate a final image of the scene. In an embodiment, tiles that lie outside the image region 110 are not rendered because of the transformation computed in step 412. The final image is displayed to the user.

5.0 Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
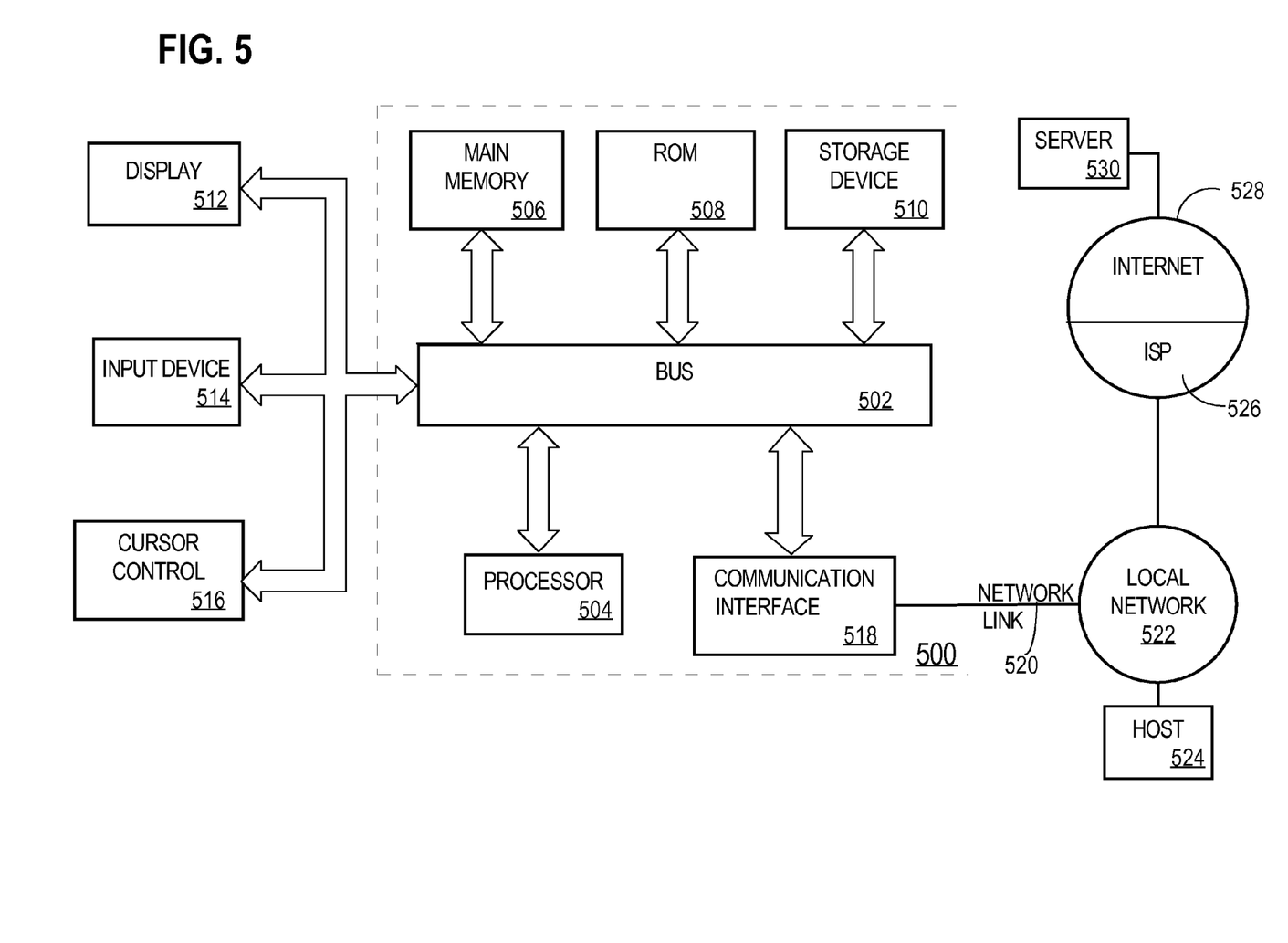
FIG. 5 is a block diagram that illustrates a computer system with which the techniques herein may be implemented.

For example, FIG. 5 is a block diagram that illustrates a computer system 500. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. The input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In an embodiment, the process supports more complex image regions rather than visible rectangles, and could allow for fetching only tiles that cover the regions. For example, the approach herein may be applied to determining visible regions of images that are applied to solids such as mugs, skateboard decks or other custom manufactured products. As a particular example, a user may wish to have a visualization of an image wrapped around a mug and viewed from the rear or another angle at which part of the image is not visible and non-contiguous parts of the image are visible. The visible portions of the wrapped image may be determined using the same general techniques provided herein and the process may be configured to retrieve tiles for only those portions of the images that will be visible in the final rendering.

In an embodiment, the process supports generating lower resolution images, at rendering time, that cover specific visible regions on servers that are attached to the image store, and then transfer only those specific regions to the rendering client system. For example, many of the processes herein may be implemented in one or more computer programs, other software elements, or other logic in the server computer 208 rather than rendering clients 206. Further, when the techniques are implemented in the server computer 208, other optimizations may be applied such as performing scaling and generating the required derivative images in multiple resolutions on-the-fly as original images are retrieved from the image store 210. For example, if the process determines that an 1800×1800 pixel image is needed as in the example previously described, the server computer 208 could be configured to generate a derivative image on-the-fly at exactly the desired 1800×1800 pixel resolution, rather than pre-storing multiple derivative images and then rounding up in resolution to the next available derivative image.

Additionally or alternatively, the rendering clients 206 may be configured to request a minimum rectangle rather than an entire tile and the server computer 208 may be configured to create the requested minimum rectangle on-the-fly in response to such a request. For example, with or without storage of tiles in image store 210, the rendering client 206 could request the server computer 208 to deliver the visible rectangle 114 rather than a tile 108A that contains the visible rectangle, and the server computer could determine and create a response or file containing only data for the visible rectangle, further reducing the amount of data that is transferred to the rendering clients 206.

In an embodiment, the process supports pre-computing image regions for specific set models and scenes, and pre-generate images for specifically those scenes.

In an embodiment, the process supports more sophisticated image compression schemes that allow seeking to or retrieving arbitrary regions of an image without having to copy the image into a plurality of stored tiles. Examples of such image compression schemes include Progressive Graphics File (PGF) format, which provides a "region of interest" facility. Alternatively a facility could be constructed for images in the Joint Photographic Experts Group (JPEG) format, which compresses based on 8×8 blocks, to retrieve a particular one or more 8×8 blocks of interest.

What is claimed is:

1. A method comprising:
    storing, in volatile or non-volatile storage, a plurality of tiles for each respective version of a plurality of versions of a particular image;
    wherein each respective version of the plurality of versions has a different image resolution;
    wherein each respective tile of the plurality of tiles comprises a bounded region of the respective version of the particular image;
    in response to a request to render the particular image for a particular model:
        determining a first image resolution based on a display resolution where a portion of the particular image will be displayed;
        applying a scaling factor to the first image resolution to compute a second image resolution that is higher than the first image resolution;
        after applying the scaling factor to the first image resolution to compute the second image resolution, rounding the second image resolution to a third image resolution that is available from the plurality of versions of the particular image and that is higher than the second image resolution;
        after rounding the second image resolution to the third image resolution, fetching, from the plurality of tiles stored in volatile or non-volatile storage, one or more tiles that contain the portion of the particular image that will be displayed and that comprise one or more bounded regions of the respective version of the particular image matching the third image resolution;
    applying the one or more tiles to the particular model;
    rendering a final image from the one or more tiles as applied to the particular model;
    wherein the method is performed by one or more computing devices.

2. The method of claim 1 further comprising: receiving a first version of the particular image having a first image resolution; generating, from the first version of the particular image, a plurality of derivative versions of the particular image; wherein each derivative image has a lower image resolution than the first image resolution; wherein the plurality of versions of the image include the derivative versions of the particular image.

3. The method of claim 1, wherein the bounded region is a rectangle.

4. The method of claim 3, further comprising: identifying a visible rectangle in a coordinate space of the particular image; wherein the visible rectangle completely contains the portion of the image that will be visible; inflating the visible rectangle to include all tiles that overlap the visible rectangle and that are for the respective version of the particular image that has tiles with the third image resolution; wherein the fetched one or more tiles are the tiles that overlap the visible rectangle.

5. The method of claim 1, wherein the plurality of tiles are stored in compressed format; the method further comprising decompressing the one or more tiles.

6. The method of claim 1, wherein determining the first image resolution based on the display resolution where a portion of the particular image will be displayed comprises: determining a quantity of pixels associated with displaying the portion of the particular image; and wherein applying the scaling factor to the first image resolution comprises applying the scaling factor to the quantity of pixels to identify a minimum image resolution; wherein rounding the second image resolution to the third image resolution comprises rounding the minimum image resolution to a next higher image resolution available from the plurality of versions of the particular image; wherein the one or more tiles are selected from a version of the particular image having the next higher resolution.

7. The method of claim 6, wherein the scaling factor approximates the Nyquist limit.

8. The method of claim 1, wherein the model is a three-dimensional (3D) model having a particular geometry; wherein applying the one or more tiles to the model comprises computing a 3D transformation for the particular geometry to generate a transformed geometry based on the one or more tiles; mapping the one or more tiles to the transformed geometry.

9. The method of claim 8, wherein the transformed geometry excludes portions of the particular geometry that map to tiles that are not fetched from the plurality of tiles; wherein rendering the final image comprises rendering the final image according to the transformed geometry.

10. The method of claim 8, wherein the model is a 3D model of a customizable product.

11. One or more non-transitory computer-readable media storing instructions, which, when executed by one or more processors, cause one or more computing devices to perform operations comprising:
- storing, in volatile or non-volatile storage, a plurality of tiles for each respective version of a plurality of versions of a particular image;
- wherein each respective version of the plurality of versions has a different image resolution;
- wherein each respective tile of the plurality of tiles comprises a bounded region of the respective version of the particular image;
- in response to a request to render the particular image for a particular model:
  - determining a first image resolution based on a display resolution where a portion of the particular image will be displayed;
  - applying a scaling factor to the first image resolution to compute a second image resolution that is higher than the first image resolution;
  - after applying the scaling factor to the first image resolution to compute the second image resolution, rounding the second image resolution to a third image resolution that is available from the plurality of versions of the particular image and that is higher than the second image resolution;
  - after rounding the second image resolution to the third image resolution, fetching, from the plurality of tiles stored in volatile or non-volatile storage, one or more tiles that contain the portion of the particular image that will be displayed and that comprise one or more bounded regions of the respective version of the particular image matching the third image resolution;
  - applying the one or more tiles to the particular model;
  - rendering a final image from the one or more tiles as applied to the particular model.

12. The non-transitory computer readable media of claim 11 further storing instructions that cause the one or more computing devices to perform operations comprising: receiving a first version of the particular image having a first image resolution; generating, from the first version of the particular image, a plurality of derivative versions of the particular image; wherein each derivative image has a lower image resolution than the first image resolution; wherein the plurality of versions of the image include the derivative versions of the particular image.

13. The non-transitory computer readable media of claim 11, wherein the bounded region is a rectangle.

14. The non-transitory computer readable media of claim 13, further storing instructions that cause the one or more computing devices to perform operations comprising: identifying a visible rectangle in a coordinate space of the particular image; wherein the visible rectangle completely contains the portion of the image that will be visible; inflating the visible rectangle to include all tiles that overlap the visible rectangle and that are for the respective version of the particular image that has tiles with the third image resolution; wherein the fetched one or more tiles are the tiles that overlap the visible rectangle.

15. The non-transitory computer readable media of claim 11, wherein the plurality of tiles are stored in compressed format; the instructions further comprising instructions for decompressing the one or more tiles.

16. The non-transitory computer readable media of claim 11, wherein instructions for determining the first image resolution based on the display resolution where a portion of the particular image will be displayed comprise instructions for: determining a quantity of pixels associated with displaying the portion of the particular image; and wherein instructions for applying the scaling factor to the first image resolution comprises instructions for applying the scaling factor to the quantity of pixels to identify a minimum image resolution; wherein instructions for rounding the second image resolution to the third image resolution comprise instructions for rounding the minimum image resolution to a next higher image resolution available from the plurality of versions of the particular image; wherein the one or more tiles are selected from a version of the particular image having the next higher image resolution.

17. The non-transitory computer readable media of claim 16, wherein the scaling factor approximates the Nyquist limit.

18. The non-transitory computer readable media of claim 11, wherein the model is a three-dimensional (3D) model having a particular geometry; wherein instructions for applying the one or more tiles to the model comprise instructions for computing a 3D transformation for the particular geometry to generate a transformed geometry based on the one or more tiles; mapping the one or more tiles to the transformed geometry.

19. The non-transitory computer readable media of claim 18, wherein the transformed geometry excludes portions of the particular geometry that map to tiles that are not fetched from the plurality of tiles; wherein rendering the final image comprises rendering the final image according to the transformed geometry.

20. The non-transitory computer readable media of claim 18, wherein the model is a 3D model of a customizable product.

* * * * *